United States Patent Office 3,523,828
Patented Aug. 11, 1970

3,523,828
METHOD OF ACTIVATING NICKEL BATTERY ELECTRODE
Friedrich August Schneider, Nuenen, Netherlands, assignor to The International Nickel Company, Inc., New York, N.Y., a corporation of Delaware
No Drawing. Filed May 31, 1968, Ser. No. 733,324
Claims priority, application Great Britain, Dec. 8, 1967, 55,989/67
Int. Cl. H01m 35/30
U.S. Cl. 136—76           12 Claims

ABSTRACT OF THE DISCLOSURE

Directed to a process for activating sintered porous nickel battery plaques with an active mass of nickel oxide hydrate generate from nickel metal initially present in the plaque which comprises first subjecting the plaque to positive pulsed direct current anodic oxidation in alkali metal bicarbonate solution and thereafter subjecting the resulting partially activated plaque to at least one and up to six charge-discharge cycles in aqueous potassium carbonate solution to produce an active electrode having high capacity in short activation time.

---

The positive electrodes of nickel-cadmium alkaline batteries contain an active mass consisting of nickel hydrate [NiO(OH)]. Such an electrode may be produced by a chemical process involving, inter alia, impregnation of a porous sintered nickel plaque with nickel nitrate and chemically converting the nitrate to hydroxide, the cycle of steps being repeated several times. There are, however, considerable advantages, both in the saving of the number of steps and in reduction in the quantity of nickel required, in processes in which the plaque is not impregnated but instead some of the nickel in a porous sintered nickel plaque is itself converted to the hydroxide electrolytically. The invention relates to processes of this latter kind.

In such processes, the plaque is made an anode in an electrolyte of an alkali metal bicarbonate, usually sodium bicarbonate, and the nickel is anodically oxidized. The process is lengthy and a period of five to twelve days may be needed to achieve the desired capacity.

Recently, the anodic oxidation process has been improved to shorten considerably the process time. This has been achieved by using a positive pulsating current and maintaining the pH of the electrolyte in the range of 7.9 to 8.5, e.g., pH 8.0 to pH 8.4, and the temperature of the electrolyte in the range of 50° C. to 70° C., e.g., 50° C. to 60° C., as described and claimed in my U.S. application Ser. No. 507,764 filed Nov. 15, 1965.

The capacity that can be obtained depends upon the construction and thickness of the plaque, which is preferably made by sintering nickel powder round an electroformed and stretched strip or grid of nickel, as described in my U.K. patent specification No. 1,023,371. As the plaque must, of course, still have adequate strength after the anodic oxidation, it is commonly, though not necessarily, at least 1 mm. thick. Thicker plaques have certain advantages which diminish as the thickness is increased. Plaques are not often thicker than 3 mm. but may be 5 mm. or more. The sintered nickel portion of the plaque desirably has a porosity of about 50% to about 90% by volume, e.g., about 80%, and an average pore size of about $2\times10^{-2}$ mm. to about $3\times10^{-3}$ mm. This is accomplished by employing nickel powder such as carbonyl powder having a fibrous structure and the powder is mixed with about 40% by volume of a powdered heat volatilizable organic material such as methyl cellulose prior to compaction about the grid, a process which is usually carried out by roll forming. The volatilizable material is volatilized during subsequent sintering of the plaque.

The time taken to reach the practical maximum capacity in any plaque as a result of the anodic oxidation in the sodium bicarbonate solution decreases as the mean current density increase until a value of the current density is reached at which passivation of the nickel anode occurs after a few hours. The practical maximum capacity in a 1 mm. porous sintered nickel plaque charged with nickel hydrate by means of anodic oxidation in sodium bicarbonate solution is about 3 ampere hours per square decimeter (a.h./dm.$^2$). Thus, 1 mm. plaques individually anodically oxidized at three mean current densities, namely, 2 amperes per square decimeter (a./dm.$^2$), 2.5 a./dm.$^2$ and 3.5 a./dm.$^2$, employing the positive pulse direct current anodic oxidation in an aqueous sodium bicarbonate solution (130 grams per liter) provided capacities of about 2 a.h./dm.$^2$ after 24 hours at 2 a./dm.$^2$ and about 3 a.h./dm.$^2$ after 24 hours at 2.5 a./dm.$^2$, but that at 3.5 a./dm.$^2$ the nickel becomes passive after about 5 hours. In a 1 mm. plaque, the practical maximum mean current density which may be employed in the process is about 3 a./dm.$^2$.

The optimum conditions so far found for the treatment of a plaque with an incorporated expanded nickel grid in a cell containing a sodium bicarbonate electrolyte circulating in closed circuit with the cell are:

Pulsed current densities—6 a./dm.$^2$ and 1 a./dm.$^2$ alternately
Pulse times—0.6 and 1.4 seconds respectively
Mean current density—2.5 a./dm.$^2$
Temperature—55° C.
Concentration NaHCO$_3$—130 grams per liter
pH—8.1–8.2 (maintained by adding gaseous CO$_2$ to the circulating electrolyte)
Residence time of circulting electrolyte—3 minutes
Ratio of circulating electrolyte volume to cell(s) volume—about 10:1 (to secure stable conditions)

Under these conditions, a 1 mm. sintered nickel plaque will reach a capacity of 1.5 a.h./dm.$^2$ in 6 hours and 3.0 a.h./dm.$^2$ in a further 24 hours, making 30 hours in all. A 3 mm. plaque will reach a capacity of 3 a.h./dm.$^2$ in 12 hours and 6 a.h./dm.$^2$ in a further 35 hours, making 47 hours in all. These times represent a great advance but there is room for further improvement.

It is known from a paper by Turner and others presented at the Fifth International Power Source Symposium at Brighton, in September 1966, that in a plaque which is already partly activated, though not enough to provide the full capacity, increase in that capacity can be obtained more rapidly by electrolytic treatment in potassium carbonate. This treatment is ineffective, however, on a plaque that carries no pickel hydroxide. The treatment involves the alternate application of the current (that is to say, charging) and discharging with reduction of the nickel hydroxide, it being found that the capacity obtained on the next charge after each such cycle was higher than in the one before. In the process described by Turner and others, the plaque was initially chemically impregnated with nickel hydroxide, a process requiring 6 hours for a 1 mm. plaque and 12 hours for a 3 mm. plaque. The initial capacity was then doubled by the treatment in potassium carbonate. The optimum conditions for the treatment in potassium carbonate are:

| Cycle No. | Time, hours |
|---|---|
| | Charge   Discharge |
| 1 to 6 | 3+1=4 hours per cycle |

Electrolyte—7 N K$_2$CO$_3$
Temperature—50° C.
Total process time—6×4=24 hours

If the plaque is 1 mm. thick, the current density is 1.5 a./dm.$^2$ during both charge and discharge; the capacity obtained is 3 ah./dm.$^2$; and the overall time is 6+24=30 hours. If the plaque is 3 mm. thick, the corresponding figures are 3 a./dm.$^2$, 6 ah./dm.$^2$, and 12+24=36 hours.

It has now surprisingly been found that the practical maximum capacity of sintered nickel plaques can be achieved in a much shorter time than appears to be possible from the known data by the combination of the anodic oxidation processes, that is to say, by a treatment in sodium bicarbonate and a subsequent treatment in potassium carbonate.

According to the present invention, the necessary initial nickel hydroxide is produced by anodic oxidation of nickel metal present in the sintered nickel plaque for a short time in an aqueous alkali metal bicarbonate solution containing, for example, 80 to 135 grams per liter of sodium bicarbonate, at a mean current density so high that passivation of the nickel would occur before the attainment of maximum capacity of the process were continued. The anodic oxidation is then completed in an alkali metal carbonate by charge-discharge cycles. The alkali metal carbonate can be lithium carbonate, sodium carbonate or potassium carbonate, but potassium carbonate is much to be preferred. It is surprisingly found that plaques treated in sodium bicarbonate at mean current densities which lead to passivation if the treatment is prolonged above five to six hours do not passivate in potassium carbonate. The reaction mechanism is not understood but the phenomenon is very well established.

The initial anodic oxidation, in which the electrolyte is preferably sodium bicarbonate, may advantageously be carried out at a mean current density (the current being pulsed) that is as high as is possible without damaging the plaque and be continued for a sufficient period to give 0.4 to 0.5 times the estimated final capacity of the resulting electrode. In the first cycle of the final cyclic anodic oxidation, it is preferred that the current density be numerically equal to the capacity per unit area obtained in the initial anodic treatment and to increase in subsequent cycles, either in each cycle or otherwise. This final anodic oxidation accomplished by charge-discharge cycles in alkali metal carbonate solution should not include more than 6 cycles because otherwise, the sintered porous body of the plate is destroyed and the increase in current density in any cycle should not exceed 15% of that in the previous cycle as otherwise blistering of the plate will occur.

Two examples will now be given.

EXAMPLE I

A 1 mm. thick sintered nickel plaque with an incorporated expanded nickel grid and having a porosity of about 75% by volume with an average pore size of about 2×10$^{-2}$ mm. in the sintered nickel is first anodically treated in a sodium bicarbonate electrolyte at the highest possible mean current density. The conditions are:

Process time—1 hour.
Pulsed current densities—6 a./dm.$^2$ and 2.5 a./dm.$^2$ respectively
Pulse times—0.6 and 1.4 seconds respectively
Mean current density—3.55 a./dm.$^2$
Temperature—55° C.
Concentration NaHCO$_3$—130 grams per liter
pH—8.3 to 8.4
Residence time of circulating electrolyte—3 minutes This step yields a capacity of 1.3 ah./dm.$^2$.

The plaque is next subjected to six cycles of charge and discharge in potassium carbonate (7 N K$_2$CO$_3$) under the known optimum temperature of 50° C. at the following rates:

| Cycle No. | Time, hours | | Current density, a./dm.$^2$ | |
|---|---|---|---|---|
| | Charge | Discharge | Charge | Discharge |
| 1 and 2 | 2¾ | ¼ | 1.3 | 5.2 |
| 3 and 4 | 2¾ | ¼ | 1.5 | 6 |
| 5 and 6 | 2¾ | ¼ | 1.7 | 6.8 |

This yields a capacity of 3.2 ah./dm.$^2$ in a total time of 1+18=19 hours. Thus, for a 1 mm. thick plaque, the time of activation can be reduced from about 30 hours to 19 hours, and the final capacity raised from 3 to 3.2 ah./dm.$^2$.

EXAMPLE II

A 3 mm. thick sintered nickel plaque with an incorporated expanded nickel grid and having a porosity of about 75% by volume and an average pore size of about 2.5×10$^{-2}$ mm. in the sintered nickel portion is first anodically treated in a sodium bicarbonate electrolyte as in Example I but with the different condition shown below:

Process time—2 hours

The capacity obtained is 2.7 ah./dm.$^2$. The plaque is then subjected to six cycles of charge and discharge in potassium carbonate as in Example I, with the same charge and discharge times of 2¾ and ¼ hours, respectively, but with the following current densities:

A./dm.$^2$

| Charge | Discharge |
|---|---|
| 2.7 | 10.8 |
| 3 | 12 |
| 3.5 | 14 |

The capacity obtained is 6.5 ah./dm.$^2$, a value previously regarded as not practical and the time is reduced from about 36 hours to 20 hours.

It appears from the data presented hereinbefore that the two oxidation processes behave contradictorily. Thus, the oxidation in sodium bicarbonate solution starts easily at a high rate but as soon as the nickel surface is covered with nickel hydrate [NiO(OH)] the rate decreases to less than one-tenth of the original rate. In the charge-discharge cycling in potassium carbonate solution, however, it is difficult to initiate oxidation of the nickel but as soon as the nickel surface is covered sufficiently with nickel hydrate, the oxidation proceeds rapidly. The invention provides substantial economy in relation to the equipment required for the production of a fixed amount of capacity per unit of time. Thus, for a similar annual capacity using only the sodium bicarbonate activation, six times the quantity of equipment would be required. Further advantages include a reduction of carbon dioxide consumption to only one-sixth without increasing the electrolyte consumption. In addition to these practical advantages, no additional nickel is required to produce the active nickel hydrate as is done in the case where a separate chemical impregnating and reduction process is employed.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. A process for producing a nickel battery electrode consisting essentially of sintered porous nickel with an active mass of nickel oxide hydrate generated from nickel initially present in the plaque impregnated therein which comprises subjecting a porous nickel plaque to anodic oxidation by positively pulsed direct current in an aqueous alkali metal bicarbonate solution having a pH of about 7.9 to about 8.5 which is continuously recirculated to generate an active nickel oxide hydrate mass upon the nickel surfaces of said plaque and thereafter subjecting the resulting partially activated plaque to at least one and up to six charge-discharge cycles in an aqueous alkali metal carbonate solution to produce an active electrode having high capacity in a substantially shorter activation time as compared to the time required for activation using only the pulsed current activation step.

2. A process according to claim 1 wherein the pulsed current anodic oxidation is conducted in an aqueous sodium bicarbonate solution containing about 80 to about 135 grams per liter of sodium bicarbonate at a temperature of about 50° C. to about 70° C.

3. A process according to claim 2 wherein the sodium bicarbonate solution has a concentration of about 130 grams per liter and a temperature of about 55° C.

4. A process according to claim 3 wherein the pulsed current is applied alternatively at a current density of about 6 amperes per square decimeter for about 0.6 second and about 2.5 amperes per square decimeter for about 1.4 seconds.

5. A process according to claim 1 wherein the charge-discharge cycle is conducted in an aqueous solution containing about 7 normal potassium carbonate at a temperature of about 50° C.

6. A process according to claim 4 wherein the charge-discharge cycle is conducted in an aqueous solution containing about 7 normal potassium carbonate at a temperature of about 50° C.

7. A process according to claim 1 wherein the first cycle of the charge-discharge cycle is conducted at a current density substantially equal numerically to the plaque capacity per unit area obtained in the pulsed direct current anodic oxidation step.

8. A process according to claim 4 wherein the first cycle of the charge-discharge cycle is conducted at a current density substantially equal numerically to the plaque capacity per unit area obtained in the pulsed direct current anodic oxidation step.

9. A process according to claim 7 wherein the increase in applied current density in any subsequent charge cycle does not exceed 15% of that in the previous cycle and no more than 6 charge-discharge cycles are employed.

10. A process according to claim 8 wherein the increase in applied current density in any subsequent charge cycle does not exceed 15% of that in the previous cycle and no more than 6 charge-discharge cycles are employed.

11. A process according to claim 9 wherein the charge cycle time is 2¾ hours and the discharge cycle time is ¼ hour.

12. A process according to claim 10 wherein the charge cycle time is 2¾ hours and the discharge cycle time is ¼ hour.

References Cited

UNITED STATES PATENTS

| 3,455,741 | 7/1969 | Schneider | 136—76 |
| 3,274,028 | 9/1966 | Yutaka-Okinaka et al. | 136—29 |
| 3,335,033 | 8/1967 | Kober | 136—29 |

FOREIGN PATENTS

| 469,453 | 7/1937 | Great Britain. |

WINSTON A. DOUGLAS, Primary Examiner

C. F. LEFEVOUR, Assistant Examiner

U.S. Cl. X.R.

136—29; 204—56

PO-1050
(5/69)

UNITED STATES PATENT OFFICE
CERTIFICATE OF CORRECTION

Patent No. 3,523,828      Dated August 11, 1970

Inventor(s) Friedrich August Schneider

It is certified that error appears in the above-identified patent and that said Letters Patent are hereby corrected as shown below:

In the Abstract, Col. 1, line 17, change "generate" to --generated--.

Line 58, change "1,023,371" to --1,024,371--. Line 67, change "3 x $10^{-3}$" to --3 x $10^{-2}$--.

Col. 2, line 6, change "increase" to --increases--. Line 35, correct spelling of "circulating". Line 54, correct spelling of "nickel".

Col. 3, line 20, change "of", Second occurence, to --if--.

Col. 5, line 16, (line 2 of claim 4), change "alternatively" to --alternately--.

Signed and sealed this 6th day of July 1971.

(SEAL)
Attest:

EDWARD M. FLETCHER, JR.
Attesting Officer

WILLIAM E. SCHUYLER, JR.
Commissioner of Patents